US012589826B2

(12) United States Patent
    Meyers

(10) Patent No.: US 12,589,826 B2
(45) Date of Patent: Mar. 31, 2026

(54) THREE-WHEELED ELECTRIC SCOOTER DEVICE

(71) Applicant: David Meyers, West Hollywood, CA (US)

(72) Inventor: David Meyers, West Hollywood, CA (US)

( * ) Notice: Subject to any disclaimer, the term of this patent is extended or adjusted under 35 U.S.C. 154(b) by 372 days.

(21) Appl. No.: 18/524,089

(22) Filed: Nov. 30, 2023

(65) Prior Publication Data

US 2025/0178688 A1    Jun. 5, 2025

(51) Int. Cl.
    B62K 15/00      (2006.01)
    B62K 5/025      (2013.01)
    B62K 5/027      (2013.01)
    B62K 21/16      (2006.01)
    B62K 23/02      (2006.01)

(52) U.S. Cl.
    CPC ............ B62K 15/006 (2013.01); B62K 5/025 (2013.01); B62K 5/027 (2013.01); B62K 21/16 (2013.01); B62K 23/02 (2013.01); *B62K 2202/00* (2013.01)

(58) Field of Classification Search
    CPC ................................ B62K 5/025; B62K 5/023
    See application file for complete search history.

(56) References Cited

U.S. PATENT DOCUMENTS

| | | | | |
|---|---|---|---|---|
| 4,354,569 | A | * 10/1982 | Eichholz | B62D 61/08 |
| | | | | 74/478 |
| 5,894,898 | A | 4/1999 | Catto | |

| | | | | |
|---|---|---|---|---|
| 6,345,678 | B1 | * 2/2002 | Chang | B62K 3/002 |
| | | | | 180/181 |
| D745,608 | S | 12/2015 | Xu | |
| 9,265,675 | B2 | * 2/2016 | Ransenberg | B62K 5/02 |
| 9,289,339 | B2 | * 3/2016 | Gray | B62J 9/21 |
| 9,527,546 | B2 | * 12/2016 | Lee | B62K 5/025 |
| 9,592,876 | B2 | 3/2017 | Lovley | |
| D848,563 | S | 5/2019 | Cao | |
| 10,479,436 | B2 | * 11/2019 | Kosco | B62K 5/027 |
| 10,800,476 | B1 | * 10/2020 | Thienphrapa | B62J 9/14 |
| 10,850,783 | B2 | 12/2020 | Cordero | |
| 11,001,152 | B2 | * 5/2021 | Caro Suarez | B60L 3/08 |
| 11,059,538 | B1 | 7/2021 | Youn | |

(Continued)

FOREIGN PATENT DOCUMENTS

| | | | | |
|---|---|---|---|---|
| CN | 207595180 | U | * 7/2018 | |
| CN | 109649553 | A | * 4/2019 | B62K 15/006 |

(Continued)

*Primary Examiner* — Kevin Hurley

(57)                ABSTRACT

A scooter for personal transport includes a board having top and bottom sides extending between front and rear edges. A power source is attached to the board. A handle with a wheel end and a grip end is coupled to the front edge. A grip is coupled to the grip end. A throttle button is mounted to the grip and electronically coupled with the power source. A pair of rear wheels is rotatably attached to the bottom side of the board proximate to the rear edge. Rear motors are coupled to each rear wheel and electronically coupled with the power source. A front wheel is rotatably attached to the wheel end. A front motor is coupled with the front wheel and electronically coupled with the power source. The power source sends electricity to the front and rear motors when the throttle button is actuated, rotating the front and rear wheels.

19 Claims, 12 Drawing Sheets

(56)                    References Cited

U.S. PATENT DOCUMENTS

| | | | |
|---|---|---|---|
| 11,167,200 B2 | 11/2021 | Treadway | |
| 11,572,123 B2 | 2/2023 | Huang | |
| 2025/0058847 A1 * | 2/2025 | Grant | B62K 5/025 |

FOREIGN PATENT DOCUMENTS

| | | | |
|---|---|---|---|
| WO | WO-2007136275 A2 * | 11/2007 | B60L 50/60 |
| WO | WO2019156285 | 8/2019 | |
| WO | WO-2023069414 A1 * | 4/2023 | B62L 3/02 |

* cited by examiner

130

THREE-WHEELED ELECTRIC SCOOTER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scooters and more particularly pertains to a new scooter for personal transport of a user.

(2) Description of Related Art Including Information Disclosed Under 37 CFR 1.97 and 1.98

The prior art relates to scooters. Scooters typically have a front wheel and a rear wheel that are aligned with each other and positioned on opposing lateral ends of a board. The user typically stands on the board. Some prior art scooters are propelled manually, by the foot and leg of the user, while the user steers the board with a handle extending upwardly from the board. Other prior art scooters are propelled by mechanical or electrical motors. However, these scooters can be difficult to steer and balance because the scooter only has two wheels, one at the front and one at the back. Thus, there is a need in the art for a scooter that provides increased support and stability for the user.

BRIEF SUMMARY OF THE INVENTION

An embodiment of the disclosure meets the needs presented above by generally comprising a board having a top side and a bottom side. The top side and the bottom side extend between a front edge and a rear edge. A power source is attached to the bottom side. A handle is coupled to the front edge. The handle has a wheel end and a grip end. A grip is coupled to the grip end. A throttle button is mounted on the handle adjacent to the grip. The throttle button is electronically coupled with the power source. A pair of rear wheels is rotatably attached to the bottom side of the board proximate to the rear edge. A pair of rear motors is operatively coupled to the pair of rear wheels. Each of the pair of rear motors is electronically coupled with the power source. The power source sends electricity to each of the pair of rear motors when the throttle button is actuated thereby actuating a rotation of the pair of rear wheels to propel the board in a forward direction. A front wheel is rotatably attached to the wheel end. The front wheel pivots when the handle is turned thereby facilitating steering of the board. A front motor is operably coupled with the front wheel and is electronically coupled with the power source. The power source sends electricity to the front motor when the throttle button is actuated thereby actuating a rotation of the front wheel to propel the board in the forward direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
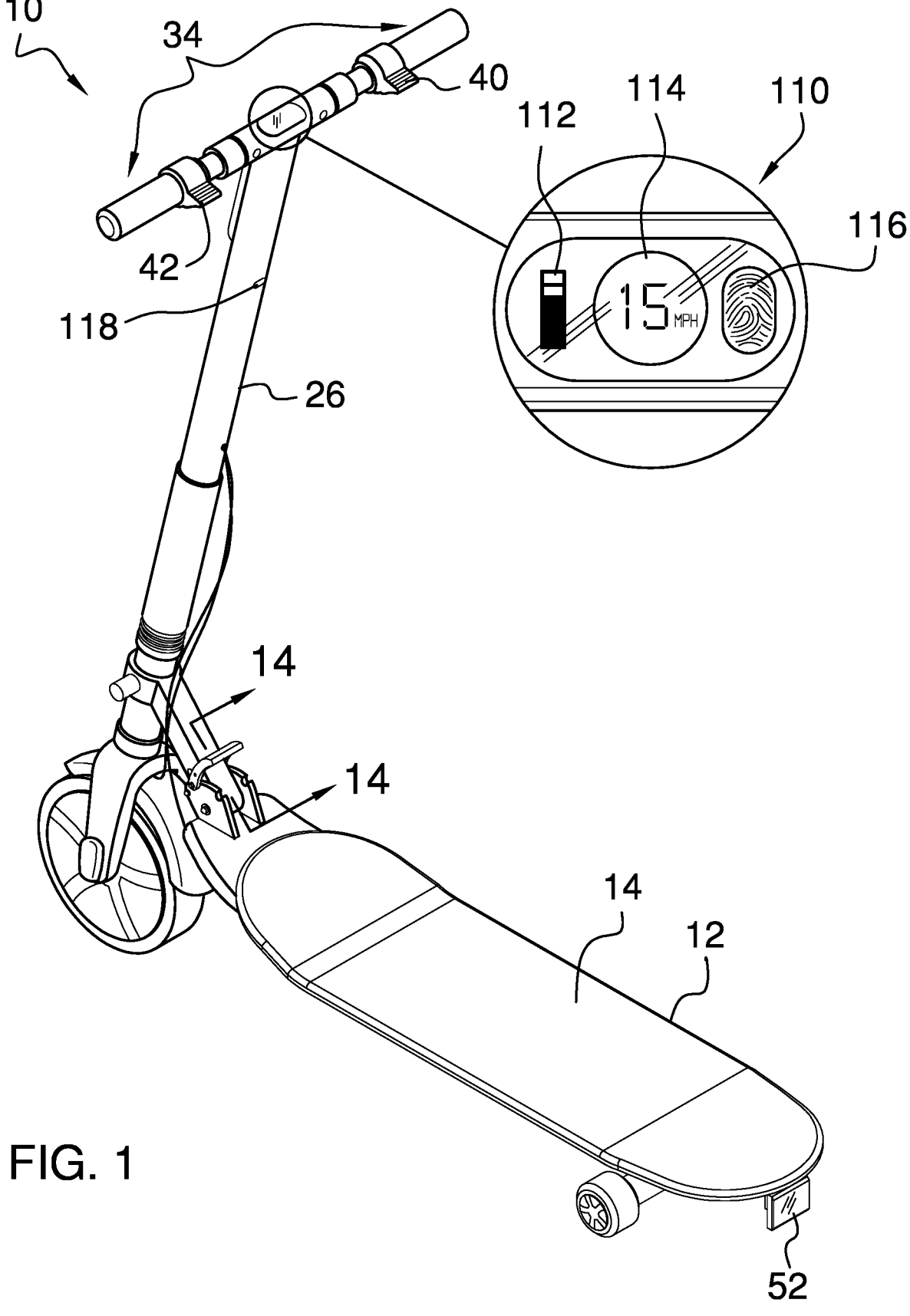
FIG. 1 is an isometric view of a three-wheeled electric scooter device according to an embodiment of the disclosure.
Figure 2:
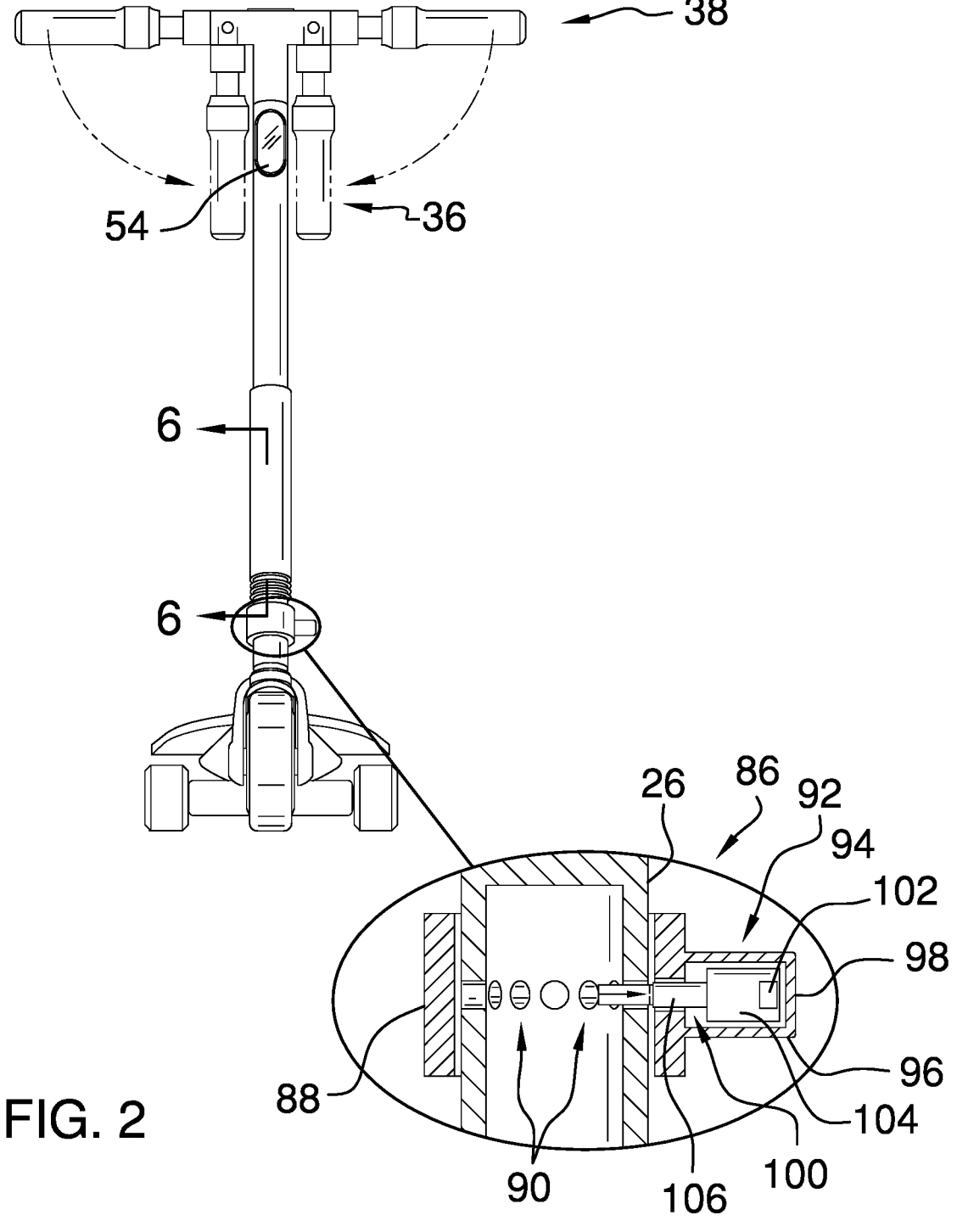
FIG. 2 is a front view of an embodiment of the disclosure.
Figure 3:
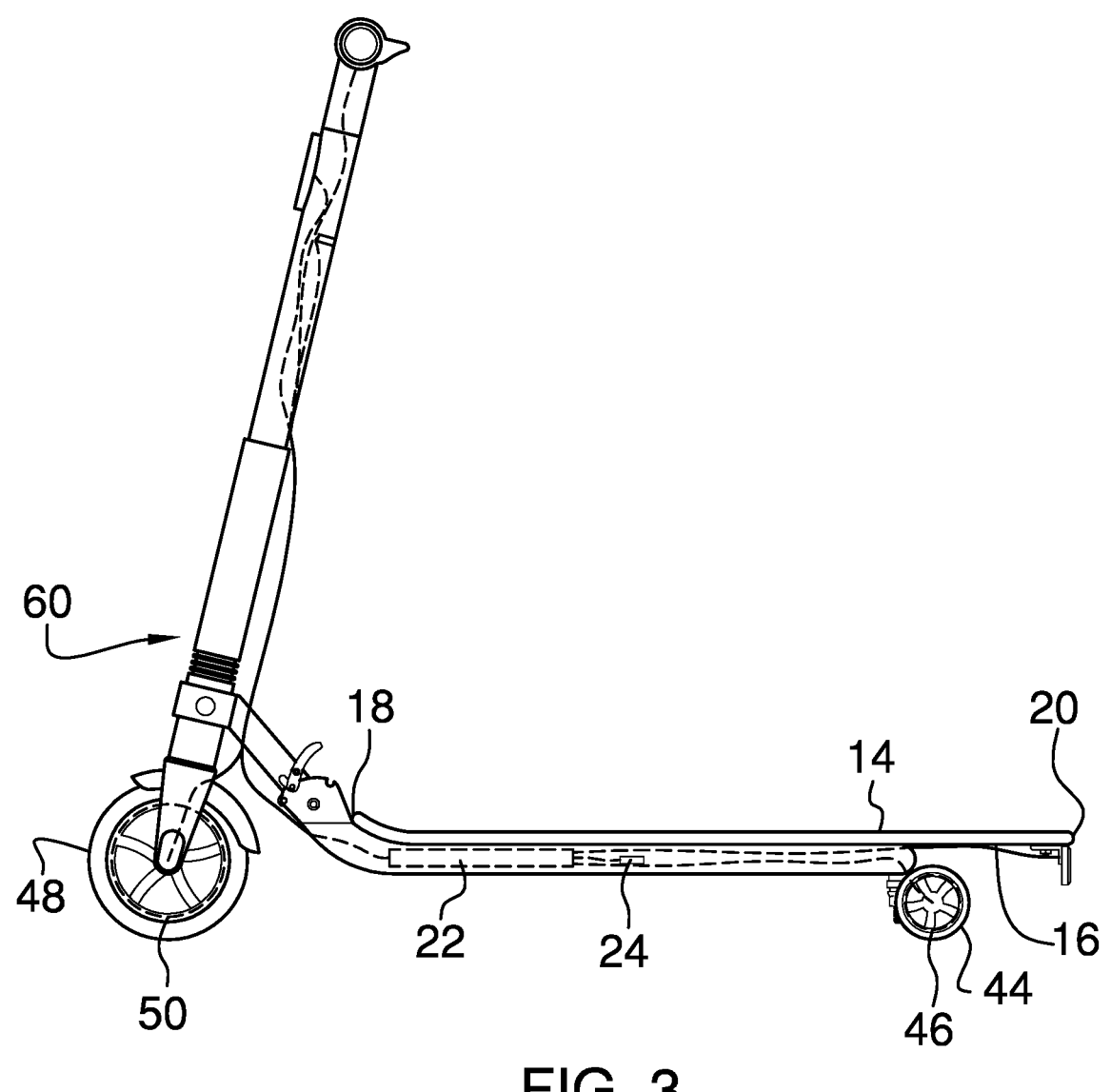
FIG. 3 is a side view of an embodiment of the disclosure.

With reference now to the drawings, and in particular to FIGS. 1 through 14 thereof, a new scooter embodying the principles and concepts of an embodiment of the disclosure and generally designated by the reference numeral 10 will be described.

As best illustrated in FIGS. 1 through 14, the three-wheeled electric scooter device 10 generally comprises a board 12 having a top side 14 and a bottom side 16. The top side 14 and the bottom side 16 extend between a front edge 18 and a rear edge 20. For example, the board 12 may resemble the deck of a longboard. In some such example embodiments, the board 12 may have a length between 40.0 inches and 46.0 inches and a width between 9.0 inches and 10.0 inches. In other examples, the board 12 may more closely resemble the foot deck of a skateboard or a kick scooter, with relatively smaller dimensions.

A power source 22 is attached to the board 12, for example being positioned on the bottom side 16. In some embodiments, the power source 22 may be a rechargeable battery.

A charging input port 24 may be inset into the board 12 and exposed within the board 12. The charging input port 24 may be positioned proximate to the power source 22, for example being on the bottom side 16 of the board 12. The charging input port 24 is electronically coupled with the power source 22. The charging input 24 port is generally configured to receive a power cord for recharging the power source 22.

A handle 26 is coupled to the board 12, for example adjacent to the front edge 18. The handle 26 generally has a wheel end 28, a grip end 30, and a steering column 32 that is attached to and extend between the wheel end 28 and the grip end 30. The handle 26 may be pivotably coupled to the board 12 whereby the handle 26 can be selectively pivoted downwardly toward the top side 14 of the board 12 to form a folded configuration 58 and upwardly from the top side 14 to form an upright configuration 60.

The handle 26 may have a length facilitating a user 130 in holding the handle 26 at the grip end 30 for steering the board 12 while the user 130 is standing on the board 12. For example, the handle 26 may have a length between 40.0 inches and 50.0 inches. In other examples, such as embodiments designed for use by children, the handle 26 may have a relatively shorter length so that the child user 130 can comfortably grasp the handle 26 while standing on the board 12.

A pair of grips 34 may be coupled to the grip end 30. For example, the pair of grips may extend outwardly from the grip end 30. In some embodiments, each of the pair of grips 34 may be pivotably coupled to opposing lateral sides of the handle 26. Each of the pair of grips 34 may pivot downwardly toward the handle 26 into a storage configuration 36. Each of the pair of grips 34 is generally adjacent to and parallel with the handle 26 when the pair of grips 34 is in the storage configuration 36. Each of the pair of grips 34 may also pivot upwardly from the storage configuration 36 into a holding configuration 38. Each of the pair of grips 34 is generally parallel with the other and perpendicular with the handle 26 when the pair of grips 34 is in the holding configuration 38.

In other embodiments, a single grip may be coupled to the grip end 30 of the handle 26. The single grip may be pivotably coupled to the grip end 30, for example as described above. Alternatively, the single grip may be statically or immovably coupled to the grip end 30.

A throttle button 40 is generally mounted to the handle 26 adjacent to a first one of the pair of grips 34. In other embodiments, the throttle button 40 may be mounted to the first one of the pair of grips 34, to the single grip, or to the handle 26 adjacent to the single grip. The throttle button 40 is electronically coupled with the power source 22.

A brake button 42 is generally mounted to the handle 26 adjacent to a second one of the pair of grips 34. In other embodiments, the brake button 42 may be mounted to the second one of the pair of grips 34, the single grip, or the handle 26 adjacent to the single grip. The brake button 42 is electronically coupled with the power source 22.

Figure 4:
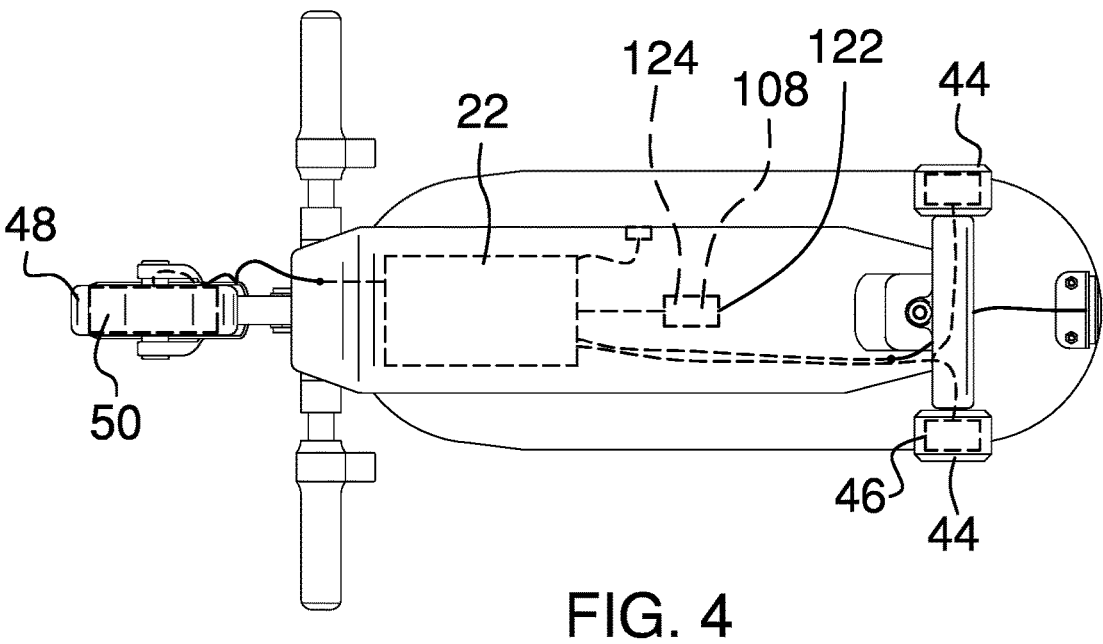
FIG. 4 is a bottom view of an embodiment of the disclosure.
Figure 5:
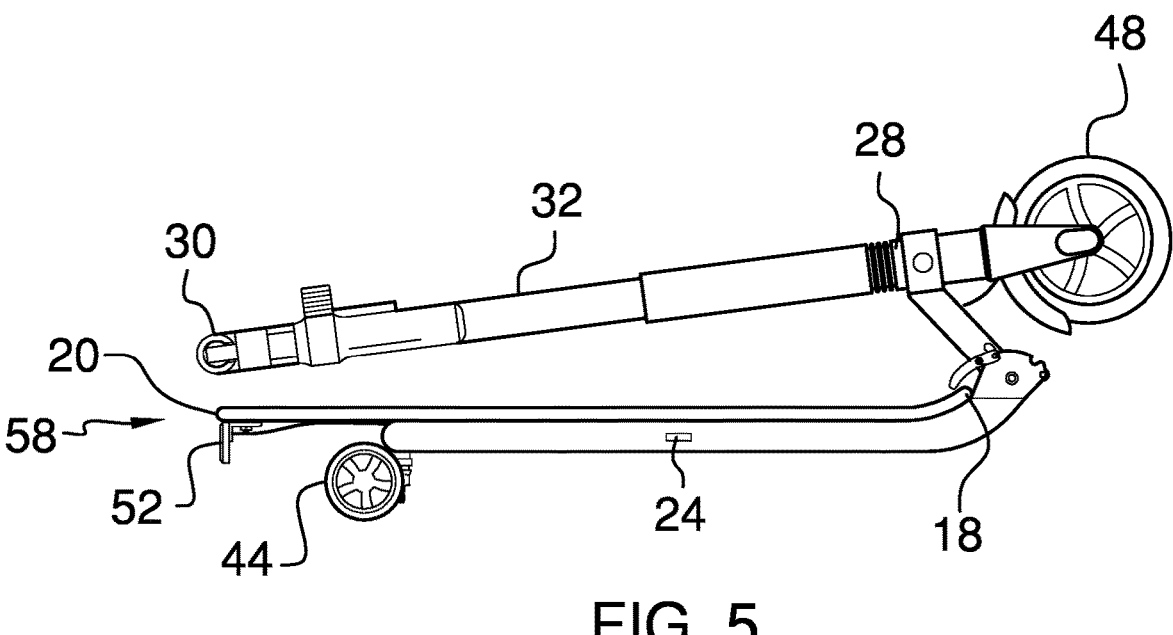
FIG. 5 is a side view of an embodiment of the disclosure.

A pair of rear wheels 44 is rotatably attached to the bottom side 16 of the board 12 proximate to the rear edge 20. Each of the pair of rear wheels 44 may be spaced from the other whereby the pair of rear wheels 44 is positioned beneath opposing lateral edges of the board 12. Typically, the pair of rear wheels 44 will be aligned with each other beneath the board 12, as shown in FIG. 4.

The three-wheeled electric scooter device 10 also generally includes a pair of rear motors 46. Each of the pair of rear motors 46 is operatively coupled to a respective one of the pair of rear wheels 44. The pair of rear motors 46 is electronically coupled with the power source 22. The power source 22 sends electricity to each of the pair of rear motors 46 when the throttle button 40 is actuated thereby actuating a rotation of the pair of rear wheels 44 to propel the board 12 in a forward direction. A polarity of electricity running to each of the pair of rear motors 46 is reversed when the brake button 42 is actuated thereby increasing resistance of the rotation of the pair of rear wheels 44. In some embodiments, each of the pair of rear motors 46 may be an electric hub motor.

A front wheel 48 is rotatably attached to the wheel end 28. The front wheel 48 typically pivots when the handle 26 is turned thereby facilitating steering of the board 12. In some embodiments, the front wheel 48 may be larger than the pair of rear wheels 44. For example, each of the pair of rear wheels 44 may have a diameter between 2.0 inches and 3.5 inches while the front wheel 48 may have a diameter of 3.0 inches to 5.0 inches.

A front motor 50 is operably coupled with the front wheel 48. The front motor 50 is electronically coupled with the power source 22. The power source 22 sends electricity to the front motor 50 when the throttle button 40 is actuated thereby actuating a rotation of the front wheel 48 to propel the board 12 in the forward direction. The polarity of electricity running to the front motor 50 is reversed when the brake button 42 is actuated thereby increasing resistance to the rotation of the front wheel 48. In some embodiments, the front motor 50 may be an electric hub motor.

A brake light 52 may be coupled to the rear edge 20. For example, the brake light 52 may extend downwardly from the rear edge 20. The brake light 52 is electronically coupled to the power source 22. The brake light 52 may be activated when the brake button 42 is actuated.

A headlight 54 may be mounted to the handle 26, for example being positioned on the steering column 32 proximate to the grip end 30. The headlight 54 is generally directed outwardly from the handle 26 toward the forward direction. The headlight 54 is electronically coupled to the power source 22. The headlight 54 may be actuated when the power source 22 is turned on.

A handle folding mechanism 56 may couple the board 12 and the handle 26. The handle folding mechanism 56 generally facilitates the handle 26 in being pivoted downwardly over the top side 14 thereby defining the folded configuration 58. The handle folding mechanism 56 also generally facilitates the handle 26 in being pivoted upwardly from the top side 14 thereby defining the upright configuration 60.

In some embodiments, the handle folding mechanism 56 may comprise a bar 62 that is coupled to the steering column 32 of the handle 26 proximate to the wheel end 28. The bar 62 generally extends outwardly from the handle 26 toward the front edge 18 of the board 12. A pair of panels 64 may be coupled to the front edge 18 of the board 12. The pair of panels 64 are generally pivotably coupled to the bar 62. The bar 62 pivots between the pair of panels 64 when the handle 26 is pivoted between the folded configuration 58 and the upright configuration 60.

A pedal 66 may be coupled to the bar 62. The pedal 66 may be positioned proximate to the front edge 18 of the board 12. Depression of the pedal 66 may release the handle 26 from one of the folded configuration 58 and the upright configuration 60 thereby permitting the handle 26 to be pivoted between the folded configuration 58 and the upright configuration 60. Elevation of the pedal 66 may secure the handle 26 in one of the folded configuration 58 and the upright configuration 60.

A pair of notches 68 typically extend into a top edge 126 of each of the pair of panels 64. Each of the pair of notches 68 is generally spaced from the other wherein a first notch 70 of the pair of notches 68 is positioned closer to the board 12 than a second notch 72 of the pair of notches 68.

Figures 11, 12:
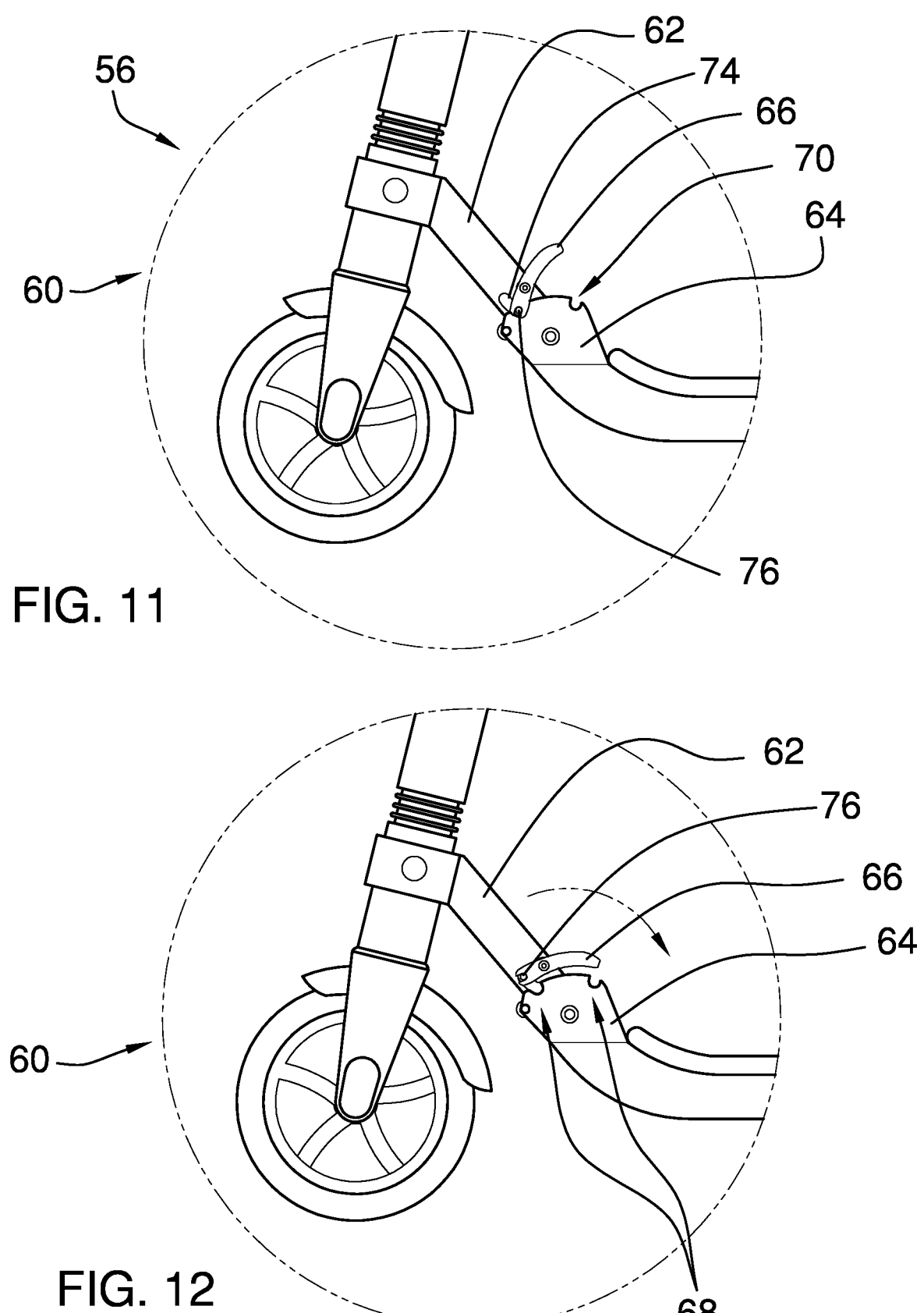
FIG. 11 is a detail view of an embodiment of the disclosure.
FIG. 12 is a detail view of an embodiment of the disclosure.
Figure 13:
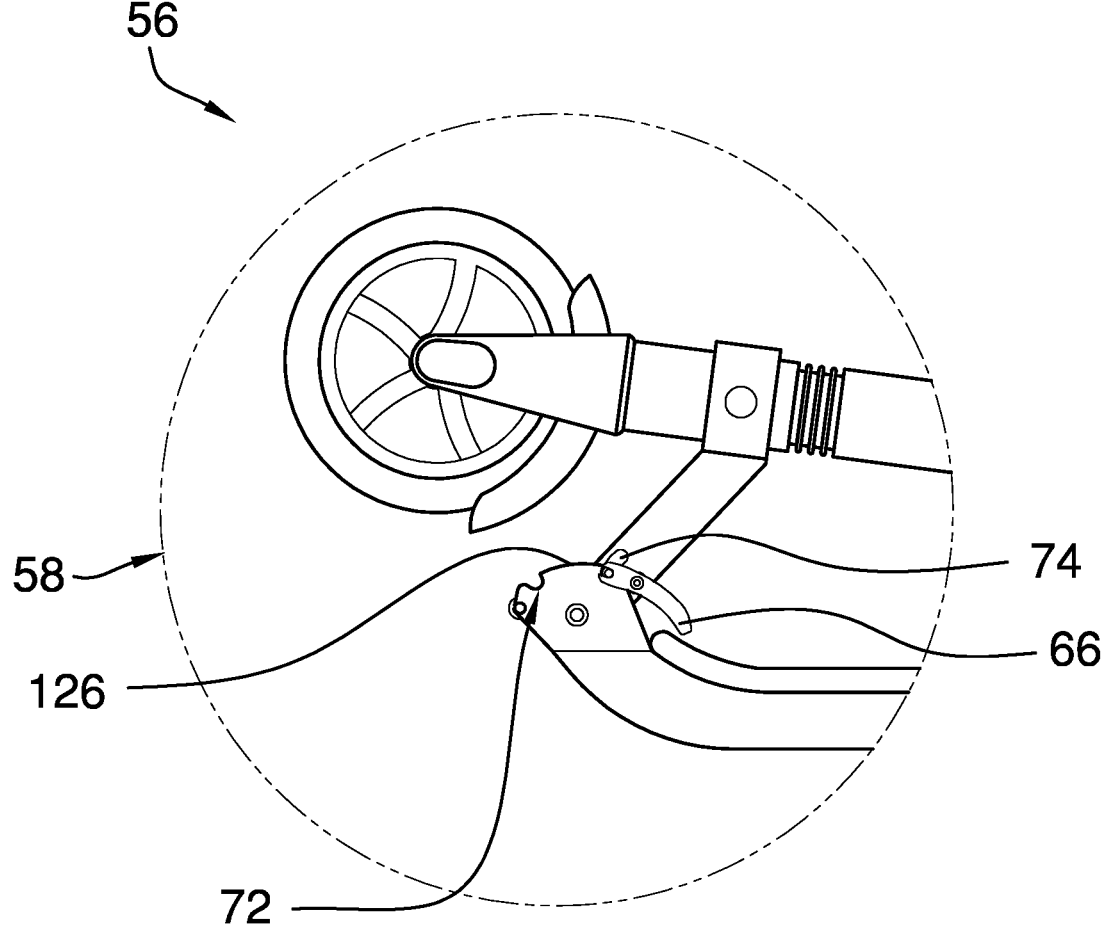
FIG. 13 is a detail view of an embodiment of the disclosure.
Figure 14:
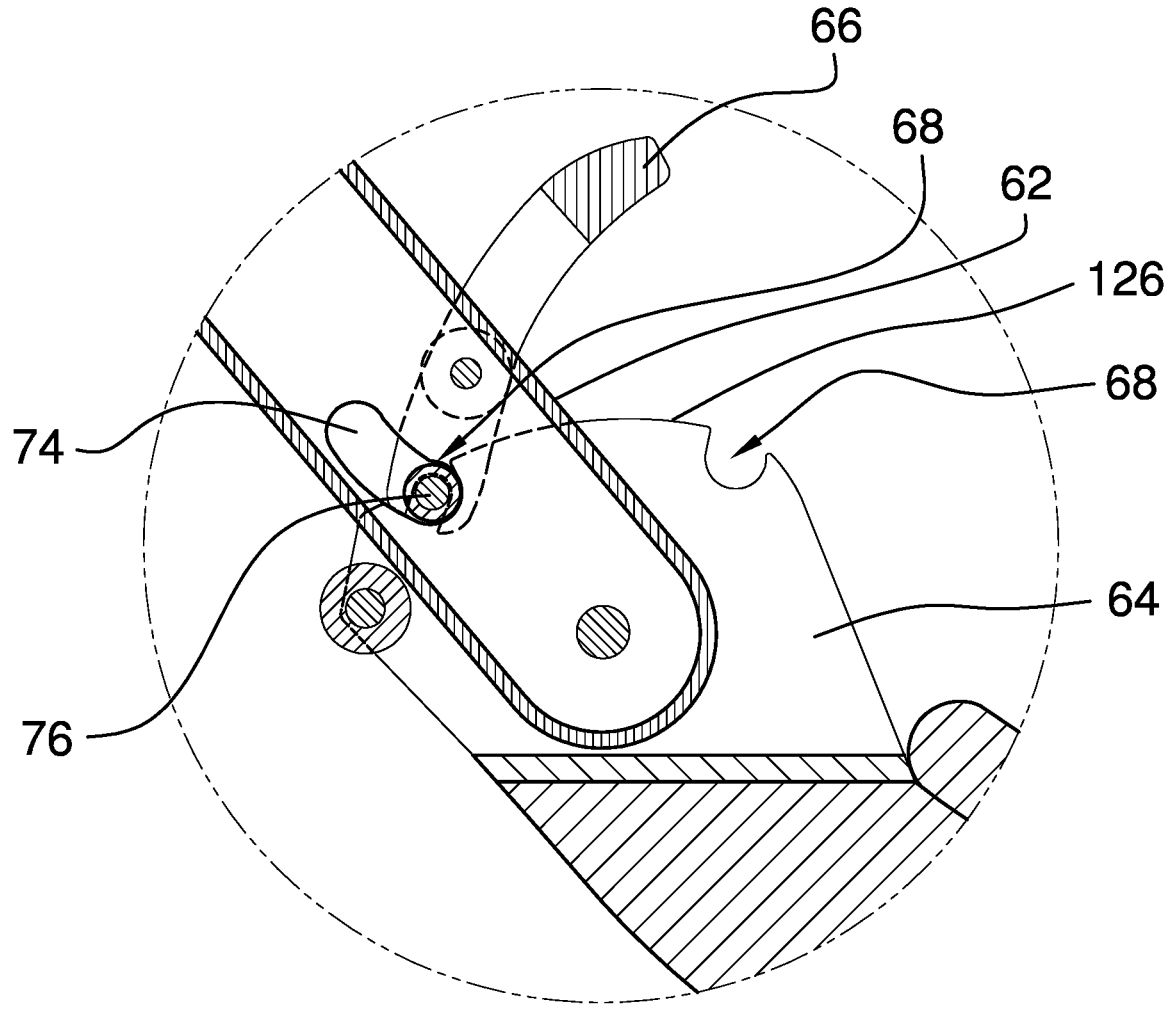
FIG. 14 is a cross-sectional view of an embodiment of the disclosure.

A slot 74 may extend into the bar 62. The slot 74 is generally positioned proximate to the top edge 126 of the pair of panels 64 whereby the slot 74 is alignable with the first notch 70 and the second notch 72 of the pair of notches 68. The slot 74 is generally aligned with the first notch 70 of the pair of notches 68 when the handle 26 is in the upright configuration 60. The slot 74 is generally aligned with the second notch 72 of the pair of notches 68 when the handle 26 is in the folded configuration 58. FIGS. 11-13 provide examples of such embodiments.

A detent 76 may be attached to the pedal 66. The detent 76 generally extends into the slot 74. The detent 76 is generally positionable within the first notch 70 of the pair of notches 68 when the pedal 66 is elevated to releasably secure the handle 26 in the upright configuration 60. The detent 76 may be positionable within the second notch 72 of the pair of notches 68 when the pedal 66 is elevated to releasably secure the handle 26 in the folded configuration 58. The detent 76 may be positionable within the slot 74 when the pedal 66 is depressed whereby the handle 26 is permitted to pivot between the upright configuration 60 and the folded configuration 58. In some embodiments, the detent 76 may be a pin.

The three-wheeled electric scooter device 10 may also include a pair of grip folding mechanisms 78. Each of the pair of grip folding mechanisms 78 may pivotably couple a respective one of the pair of grips 34 to the grip end 30 of the handle 26. Each of the pair of grip folding mechanisms 78 facilitates the respective one of the pair of grips 34 in being pivoted downwardly toward the handle 26 into the storage configuration 36. Each of the pair of grip folding mechanisms 78 facilitates the respective one of the pair of grips 34 in being pivoted upwardly from the storage configuration 36 into the holding configuration 38.

Each of the pair of grip folding mechanisms 78 may generally comprise a sleeve 80 that is slidably coupled to the respective one of the pair of grips 34. The sleeve 80 is slidable between a locked position 132 and an unlocked position 134. The sleeve 80 may abut the handle 26 when the sleeve 80 is in the locked position 132. The sleeve 80 may be spaced from the handle 26 when the sleeve 80 is in the unlocked position 134. Examples of this embodiment are provided in FIG. 9.

A cantilever 82 may be attached to and extend outwardly from the respective one of the pair of grips 34. The cantilever 82 is generally pivotably coupled to the handle 26. The cantilever 82 may be positioned within the sleeve 80 whereby the cantilever 82 is secured in one of the holding configuration 38 and the storage configuration 36 when the sleeve 80 is in the locked position 132 and whereby the cantilever 82 is pivotable to move the respective one of the pair of grips 34 between the storage configuration 36 and the holding configuration 38 when the sleeve 80 is in the unlocked position 134.

A stop 84 may be attached to and extend outwardly from the grip end 30 of the handle 26. The stop may only extend from an upper edge of the grip end 30, leaving a space 128 beneath the stop 84 for the cantilever 82 to move through when the cantilever 82 pivots the respective one of the pair of grips 34 between the storage configuration 36 and the holding configuration 38. The stop 84 is generally positioned above the cantilever 82 whereby the stop 84 inhibits the cantilever 82 from pivoting more than 90.0° upwardly from the storage configuration 36. The sleeve 80 may contact an outer edge of the stop 84 when the sleeve 90 is in the locked position 132.

A pin lock 86 may be coupled to the handle 26 to secure the handle 26 from pivoting the front wheel 48 thereby inhibiting steering of the board 12. In some examples, the pin lock 86 may include a collar 88 that is coupled to the handle 26. The collar 99 may be positioned on the steering column 32 proximate to the wheel end 28 of the handle 26.

A plurality of apertures 90 may extend into the handle 26. The plurality of apertures 90 may be aligned with each other along a transverse plane around an outer circumference of the handle 26. In embodiments, the collar 55 may cover the plurality of apertures 90.

A housing 92 may be coupled to and extend outwardly from the collar 88. The housing 92 may have a first lateral side 94, a second lateral side 96, and a peripheral side 98 that is attached to and extends between the first lateral side 94 and the second lateral side 96 to define an interior space 100. A receiver 102 may be positioned within the interior space 100. An actuator 104 may be electronically coupled to the receiver 102 and positioned in the interior space 100. A piston 106 may be mechanically coupled to the actuator 104 whereby the actuator 104 moves the piston 106 outwardly from the interior space 100 to engage an aperture of the plurality of apertures 90 when the receiver 102 signals the actuator 104 to engage the pin lock 86.

A transmitter 108 may be electronically coupled to the power source 22. The transmitter 108 is in electronic communication with the receiver 102 of the pin lock 86 whereby the transmitter 108 signals the receiver 102 to engage the pin lock 86. In some embodiments, the receiver 102 may also signal the actuator 104 to engage the pin lock 86 when the power source 22 is turned off.

A display 110 may be coupled to the handle 26, for example being positioned on the grip end 30 between the pair of grips 34. The display 110 is electronically coupled to the power source 22. The display 110 may include a battery life indicator 112 that is configured to depict a charge level of the power source 22. The display 110 may also include a speedometer 114 that is configured to measure and depict a speed of the board 12 when the board 12 is being propelled in the forward direction. The display 110 may also include a fingerprint reader 116 that is configured to recognize a fingerprint of the user 130 whereby the power source 22 is configured to turn on when the fingerprint is recognized.

A charging output port 118 may inset into the handle 26 and exposed within the handle 26. For example, the charging output port 118 may be proximate to the grip end 30. The charging output port 118 is electronically coupled to the power source 22. The charging output port 118 is configured to receive a charging cable for recharging an external electronic device. For example, the charging output port may be configured to receive a USB cable for charging a personal cellular device.

Figure 6:
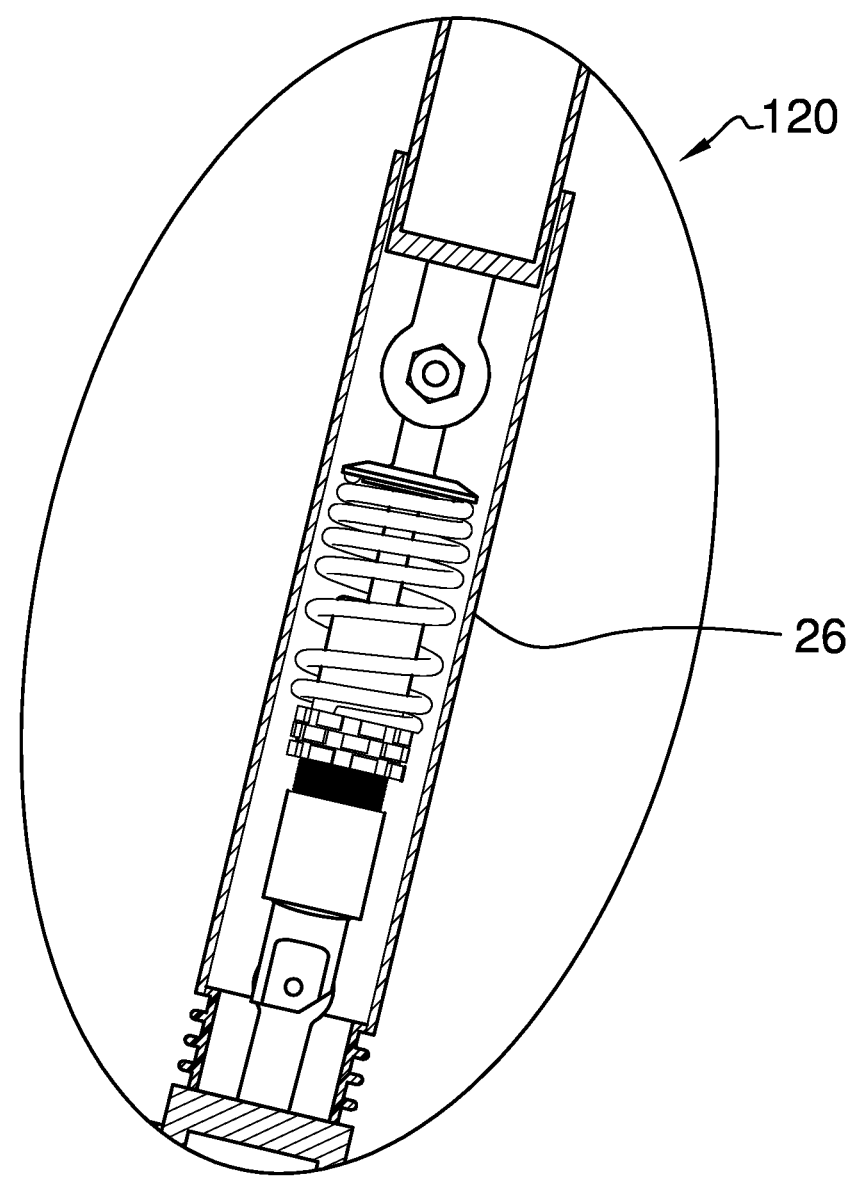
FIG. 6 is a cross-sectional view of an embodiment of the disclosure.
Figure 7:
FIG. 7 is an in-use view of an embodiment of the disclosure.
Figure 8:
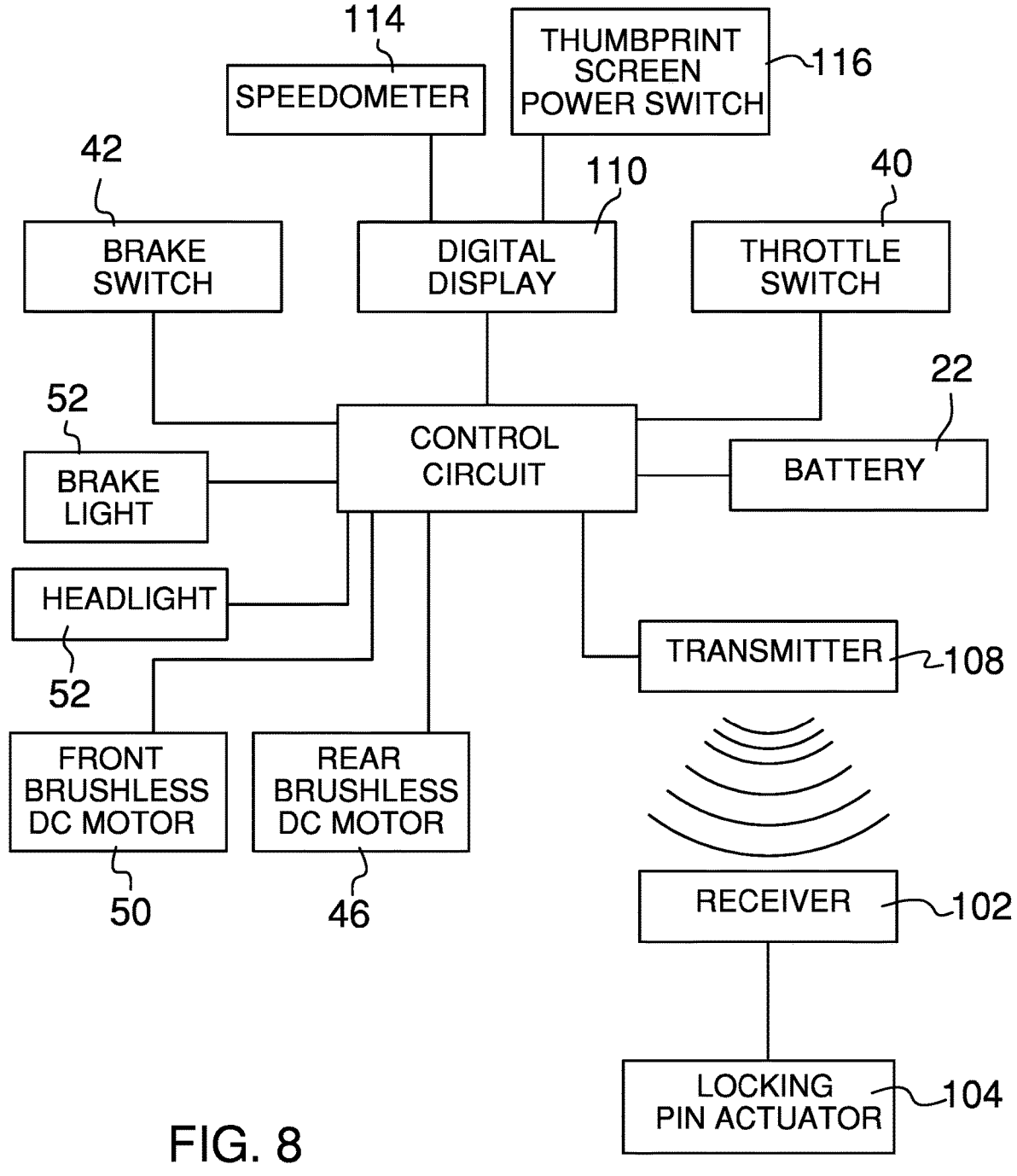
FIG. 8 is a block diagram view of an embodiment of the disclosure.
Figure 9:
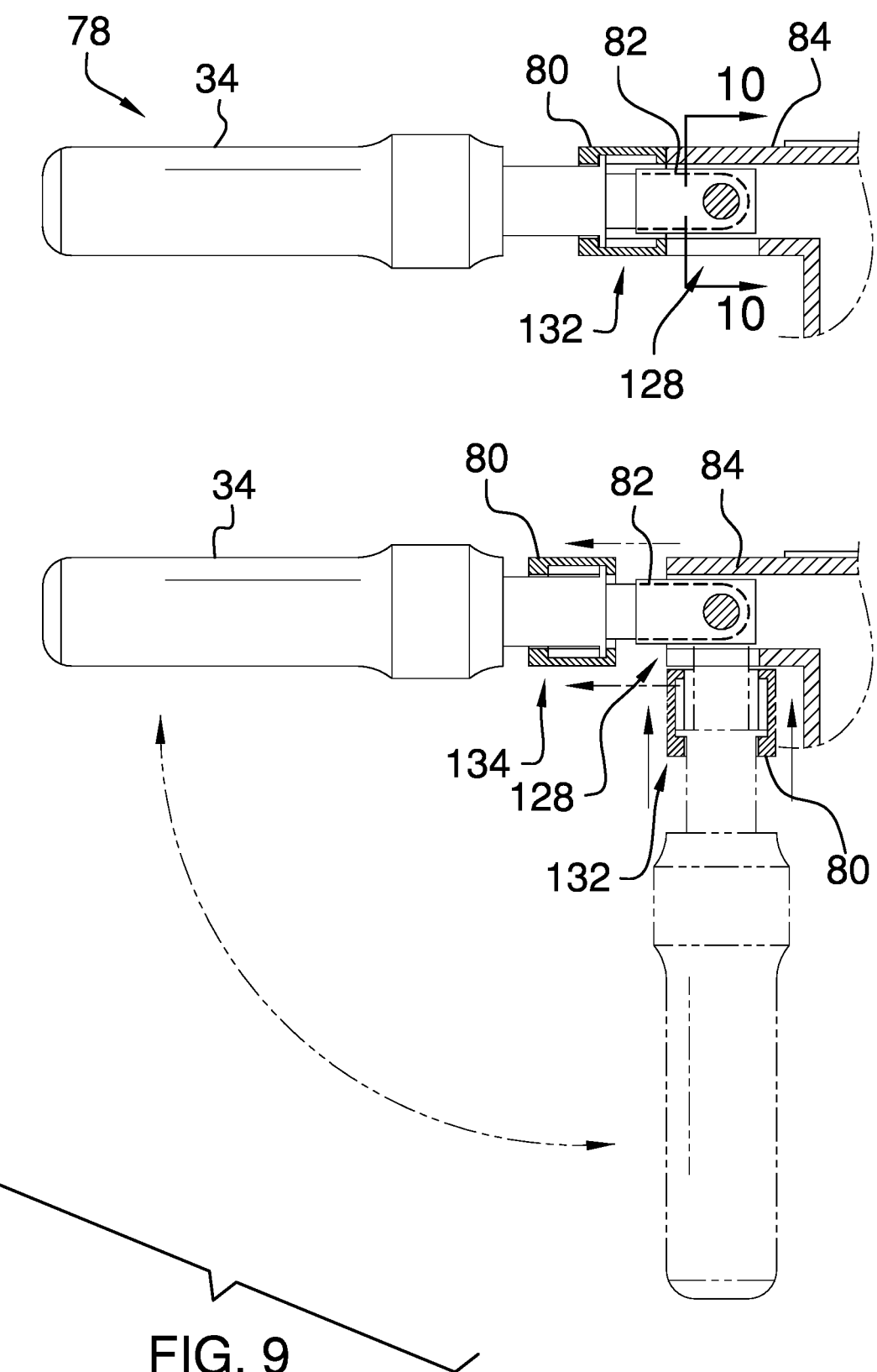
FIG. 9 is a detail view of an embodiment of the disclosure.
Figure 10:
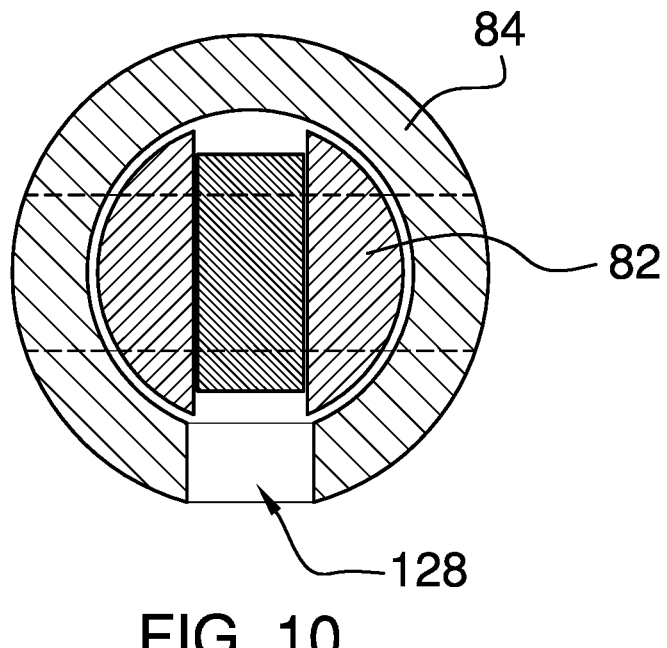
FIG. 10 is a cross-sectional view of an embodiment of the disclosure.

A shock absorber 120 may be coupled to the steering column 32 of the handle 26. The shock absorber 120 may be positioned proximate to the wheel end 28. The shock absorber 120 is generally configured to compress and extend when the board 12 is propelled over a bump thereby dampening a force of an impact to the front wheel 28 as the force travels from the front wheel 28 to the pair of grips 34 or the single grip. The shock absorber 120 may comprise a coil over shock device, as shown in FIG. 6.

A central processing unit 122 may be electronically coupled to each of the power source 22, the headlight 54, the brake light 52, the throttle button 40, the brake button 42, the front motor 50, the pair of rear motors 46, the transmitter 108, and the display 110. The central processing unit 122 is generally configured to selectively control one or more of the power source 22, the headlight 54, the brake light 52, the throttle button 40, the brake button 42, the front motor 60, the pair of rear motors 46, the transmitter 108, and the display 110. The central processing unit 122 may include a memory unit 124 that is configured to store a copy of the fingerprint of the user 130. The central processing unit 122 may be configured to compare the copy to the fingerprint read by the fingerprint reader to ensure the user 130 is authorized to use the three-wheeled electric scooter device 10. Embodiments which do not include a central processing unit 122 may be controlled by selectively directing electrical current from the power source 22 to each of the components coupled to the control circuit shown in FIG. 8.

In use, the user 130 can stand on the top side 14 of the board 12 and grip the pair of grips 34 to steer the three-wheeled scooter device 10. The front wheel 48 is rotated by the front motor 50 and the pair of rear wheels 44 is rotated by the pair of rear motors 46 when the user 130 actuates the throttle button 40, thereby propelling the board 12 in the forward direction. When the user 130 actuates the brake button 42, the polarity of electricity running to each of the front motor 50 and the pair of rear motors 46 may be reversed, increasing resistance to rotation of the front wheel 48 and the pair of rear wheels 44, respectively, thereby slowing and stopping the propulsion of the board 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal transport assembly comprising:
   a board having a top side and a bottom side, the top side and the bottom side extending between a front edge and a rear edge;
   a power source being attached to the board;
   a handle being coupled to the board and being positioned proximate to the front edge, the handle having a wheel end and a grip end;
   a grip being coupled to the grip end;
   a throttle button being mounted to the grip, the throttle button being electronically coupled with the power source;
   a pair of rear wheels being rotatably attached to the bottom side proximate to the rear edge;
   a pair of rear motors, each of the pair of rear motors being operatively coupled to a respective one of the pair of rear wheels, the pair of rear motors being electronically coupled with the power source, wherein the power source sends electricity to each of the pair of rear motors when the throttle button is actuated thereby actuating a rotation of the pair of rear wheels to propel the board in a forward direction;
   a front wheel being rotatably attached to the wheel end, the front wheel pivoting when the handle is turned thereby facilitating steering of the board; and
   a front motor being operably coupled with the front wheel, the front motor being electronically coupled with the power source, wherein the power source sends electricity to the front motor when the throttle button is actuated thereby actuating a rotation of the front wheel to propel the board in the forward direction.

2. The personal transport assembly of claim 1, wherein the handle is pivotably coupled to the front edge.

3. The personal transport assembly of claim 1, each of the front motor and the pair of rear motors further comprising an electric hub motor.

4. The personal transport assembly of claim 1, further comprising a handle folding mechanism pivotably coupling the board and the handle, the handle folding mechanism facilitating the handle in being pivoted downwardly over the top side thereby defining a folded configuration, the handle folding mechanism facilitating the handle in being pivoted upwardly from the top side thereby defining an upright configuration.

5. The personal transport assembly of claim 4, the handle folding mechanism further comprising:
   a bar being coupled to the handle proximate to the wheel end and extending outwardly from the handle toward the front edge of the board;
   a pair of panels being coupled to the front edge of the board and being pivotably coupled to the bar, the bar pivoting between the pair of panels when the handle is pivoted between the folded configuration and the upright configuration;
   a pedal being coupled to the bar, wherein depression of the pedal releases the handle from the upright configuration thereby permitting the handle to be pivoted between the folded configuration and the upright configuration, wherein elevation of the pedal secures the handle in one of the folded configuration and the upright configuration;

a pair of notches extending into a top edge of each of the pair of panels, each of the pair of notches being spaced from the other wherein a first notch of the pair of notches is positioned closer to the board than a second notch of the pair of notches;

a slot extending into the bar, the slot being positioned proximate to the top edge of the pair of panels whereby the slot is alignable with the first notch and the second notch of the pair of notches, the slot being aligned with the first notch of the pair of notches when the handle is in the upright configuration, the slot being aligned with the second notch of the pair of notches when the handle is in the folded configuration; and a detent being attached to and extending from the pedal into the slot, the detent being positionable within the first notch of the pair of notches when the pedal is elevated to releasably secure the handle in the upright configuration, the detent being positionable within the second notch of the pair of notches when the pedal is elevated to releasably secure the handle in the folded configuration, the detent being positionable within the slot when the pedal is depressed whereby the handle is permitted to pivot between the upright configuration and the folded configuration.

6. The personal transport assembly of claim 1, wherein the grip is pivotably coupled to the grip end of the handle.

7. The personal transport assembly of claim 1, further comprising a grip folding mechanism, the grip folding mechanism pivotably coupling the grip to the grip end of the handle, the grip folding mechanism facilitating the grip in being pivoted downwardly toward the handle into a storage configuration, the grip folding mechanism facilitating the grip in being pivoted upwardly from the storage configuration into a holding configuration.

8. The personal transport assembly of claim 7, the grip folding mechanism further comprising:

a sleeve being slidably coupled to the grip, the sleeve being slidable between a locked position and an unlocked position, wherein the sleeve abuts the handle when the sleeve is in the locked position, wherein the sleeve is spaced from the handle when the sleeve is in the unlocked position; and a cantilever being attached to and extending outwardly from the grip, the cantilever being pivotably coupled to the handle, the cantilever being positioned within the sleeve whereby the cantilever is secured in one of the holding configuration and the storage configuration when the sleeve is in the locked position and whereby the cantilever is pivotable to move the grip between the storage configuration and the holding configuration when the sleeve is in the unlocked position.

9. The personal transport assembly of claim 8, the grip folding mechanism further comprising a stop being attached to and extending outwardly from the grip end of the handle, the stop being positioned above the cantilever whereby the stop inhibits the cantilever from pivoting more than 90.0° upwardly from the storage configuration, the sleeve contacting an outer edge of the stop when the sleeve is in the locked position.

10. The personal transport assembly of claim 1, further comprising a pin lock being coupled to the handle to secure the handle from pivoting the front wheel when the power source is turned off thereby inhibiting steering of the board.

11. The personal transport assembly of claim 10, the pin lock further comprising:

a collar being coupled to the handle, the collar being positioned proximate to the wheel end of the handle;

a plurality of apertures extending into the handle, the plurality of apertures being aligned with each other along a transverse plane around an outer circumference of the handle, the collar covering the plurality of apertures;

a housing being coupled to and extending outwardly from the collar, the housing having a first lateral side, a second lateral side, and a peripheral side being attached to and extending between the first lateral side and the second lateral side to define an interior space;

a receiver being positioned within the interior space;

an actuator being electronically coupled to the receiver, the actuator being positioned in the interior space;

a piston being mechanically coupled to the actuator whereby the actuator moves the piston outwardly from the interior space to engage an aperture of the plurality of apertures when the receiver signals the actuator to engage the pin lock; and a transmitter being electronically coupled to the power source, the transmitter being in electronic communication with the receiver of the pin lock whereby the receiver signals the actuator to engage the pin lock when the power source is turned off.

12. The personal transport assembly of claim 1, further comprising a display being coupled to the handle, the display being electronically coupled to the power source, the display including:

a battery life indicator, the battery life indicator being configured to depict a charge level of the power source;

a speedometer, the speedometer being configured to measure and depict a speed of the board when the board is being propelled in the forward direction; and a fingerprint reader, the fingerprint reader being configured to recognize a fingerprint of a user whereby the power source is configured to turn on when the fingerprint is recognized.

13. The personal transport assembly of claim 1, further comprising:

a shock absorber being coupled to the handle, the shock absorber being configured to compress and extend when the board is propelled over a bump thereby dampening a force of an impact to the front wheel as the force travels from the front wheel to the grip.

14. The personal transport assembly of claim 13, the shock absorber further comprising a coil over shock device.

15. The personal transport assembly of claim 13, wherein the shock absorber is positioned proximate to the wheel end of the handle.

16. The personal transport assembly of claim 1, further comprising a brake button being mounted to the grip, the brake button being electronically coupled with the power source, wherein a polarity of electricity running to each of the pair of rear motors is reversed when the brake button is actuated thereby increasing resistance of the rotation of the pair of rear wheels, and wherein the polarity of electricity running to the front motor is reversed when the brake button is actuated thereby increasing resistance to the rotation of the front wheel.

17. The personal transport assembly of claim 16, further comprising a brake light being coupled to the rear edge, the brake light being electronically coupled to the power source, the brake light being activated when the brake button is actuated.

18. The personal transport assembly of claim 1, further comprising a headlight being mounted to the handle, the headlight being electronically coupled to the power source, the headlight being directed outwardly from the handle toward the forward direction.

19. A personal transport assembly comprising:

a board having a top side and a bottom side, the top side and the bottom side extending between a front edge and a rear edge;

a power source being attached to the bottom side, the power source being a rechargeable battery;

a charging input port being inset into the board and being exposed within the board, the charging input port being electronically coupled with the power source;

a handle being pivotably coupled to the front edge, the handle having a wheel end, a grip end, and a steering column being attached to and extending between the wheel end and the grip end;

a pair of grips being pivotably coupled to and extending outwardly from the grip end, the pair of grips being pivotably coupled to opposing lateral sides of the handle, each of the pair of grips pivoting downwardly toward the handle into a storage configuration, each of the pair of grips being adjacent to and parallel with the handle when the pair of grips is in the storage configuration, each of the pair of grips pivoting no more than 90.0° upwardly from the storage configuration into a holding configuration, the pair of grips being parallel with each other and being perpendicular with the handle when the pair of grips is in the holding configuration;

a throttle button being mounted to the handle adjacent to a first one of the pair of grips, the throttle button being electronically coupled with the power source;

a brake button being mounted to the handle adjacent to a second one of the pair of grips, the brake button being electronically coupled with the power source;

a pair of rear wheels being rotatably attached to the bottom side proximate to the rear edge;

a pair of rear motors, each of the pair of rear motors being operatively coupled to a respective one of the pair of rear wheels, the pair of rear motors being electronically coupled with the power source, wherein the power source sends electricity to each of the pair of rear motors when the throttle button is actuated thereby actuating a rotation of the pair of rear wheels to propel the board in a forward direction, wherein a polarity of electricity running to each of the pair of rear motors is reversed when the brake button is actuated thereby increasing resistance of the rotation of the pair of rear wheels, each of the pair of rear motors being an electric hub motor;

a front wheel being rotatably attached to the wheel end, the front wheel pivoting when the handle is turned thereby facilitating steering of the board;

a front motor being operably coupled with the front wheel, the front motor being electronically coupled with the power source, wherein the power source sends electricity to the front motor when the throttle button is actuated thereby actuating a rotation of the front wheel to propel the board in the forward direction, wherein the polarity of electricity running to the front motor is reversed when the brake button is actuated thereby increasing resistance to the rotation of the front wheel, the front motor being an electric hub motor;

a brake light being attached to and extending downwardly from the rear edge, the brake light being electronically coupled to the power source, the brake light being activated when the brake button is actuated;

a headlight being mounted to the handle, the headlight being electronically coupled to the power source, the headlight being directed outwardly form the handle toward the forward direction, the headlight being actuated when the power source is turned on;

a handle folding mechanism coupling the board and the handle, the handle folding mechanism facilitating the handle in being pivoted downwardly over the top side thereby defining a folded configuration, the handle folding mechanism facilitating the handle in being pivoted upwardly from the top side thereby defining an upright configuration, the handle folding mechanism comprising:

a bar being attached to the steering column of the handle proximate to the wheel end and extending outwardly from the handle toward the front edge of the board;

a pair of panels being coupled to the front edge of the board and being pivotably coupled to the bar, the bar pivoting between the pair of panels when the handle is pivoted between the folded configuration and the upright configuration;

a pedal being coupled to the bar, the pedal being positioned proximate to the front edge, wherein depression of the pedal releases the handle from the upright configuration thereby permitting the handle to be pivoted between the folded configuration and the upright configuration, wherein elevation of the pedal secures the handle in one of the folded configuration and the upright configuration;

a pair of notches extending into a top edge of each of the pair of panels, each of the pair of notches being spaced from the other wherein a first notch of the pair of notches is positioned closer to the board than a second notch of the pair of notches;

a slot extending into the bar, the slot being positioned proximate to the top edge of the pair of panels whereby the slot is alignable with the first notch and the second notch of the pair of notches, the slot being aligned with the first notch of the pair of notches when the handle is in the upright configuration, the slot being aligned with the second notch of the pair of notches when the handle is in the folded configuration;

a detent being attached to and extending from the pedal into the slot, the detent being positionable within the first notch of the pair of notches when the pedal is elevated to releasably secure the handle in the upright configuration, the detent being positionable within the second notch of the pair of notches when the pedal is elevated to releasably secure the handle in the folded configuration, the detent being positionable within the slot when the pedal is depressed whereby the handle is permitted to pivot between the upright configuration and the folded configuration;

a pair of grip folding mechanisms, each of the pair of grip folding mechanisms pivotably coupling a respective one of the pair of grips to the grip end of the handle, each of the pair of grip folding mechanisms facilitating the respective one of the pair of grips in being pivoted downwardly toward the handle into the storage configuration, each of the pair of grip folding mechanisms facilitating the respective one of the pair of grips in being pivoted upwardly from the storage configuration into the holding configuration, each of the pair of grip folding mechanisms comprising:

a sleeve being slidably coupled to the respective one of the pair of grips, the sleeve being slidable between a locked position and an unlocked position, wherein the sleeve abuts the handle when the sleeve is in the locked position, wherein the sleeve is spaced from the handle when the sleeve is in the unlocked position;

a cantilever being attached to and extending outwardly from the respective one of the pair of grips, the cantilever being pivotably coupled to the handle, the cantilever being positioned within the sleeve whereby the cantilever is secured in one of the holding configuration and the storage configuration when the sleeve is in the locked position and whereby the cantilever is pivotable to move the respective one of the pair of grips between the storage configuration and the holding configuration when the sleeve is in the unlocked position;

a stop being attached to and extending outwardly from the grip end of the handle, the stop being positioned above the cantilever whereby the stop inhibits the cantilever from pivoting more than 90.0° upwardly from the storage configuration, the sleeve contacting an outer edge of the stop when the sleeve is in the locked position;

a pin lock being coupled to the handle to secure the handle from pivoting the front wheel thereby inhibiting steering of the board, the pin lock including:

a collar being coupled to the handle, the collar being positioned on the steering column proximate to the wheel end of the handle;

a plurality of apertures extending into the handle, the plurality of apertures being aligned with each other along a transverse plane around an outer circumference of the handle, the collar covering the plurality of apertures;

a housing being coupled to and extending outwardly from the collar, the housing having a first lateral side, a second lateral side, and a peripheral side being attached to and extending between the first lateral side and the second lateral side to define an interior space;

a receiver being positioned within the interior space;

an actuator being electronically coupled to the receiver, the actuator being positioned in the interior space;

a piston being mechanically coupled to the actuator whereby the actuator moves the piston outwardly from the interior space to engage an aperture of the plurality of apertures when the receiver signals the actuator to engage the pin lock;

a transmitter being electronically coupled to the power source, the transmitter being in electronic communication with the receiver of the pin lock whereby the receiver signals the actuator to engage the pin lock when the power source is turned off;

a display being coupled to the handle, the display being positioned on the grip end between the pair of grips, the display being electronically coupled to the power source, the display including:

a battery life indicator, the battery life indicator being configured to depict a charge level of the power source;

a speedometer, the speedometer being configured to measure and depict a speed of the board when the board is being propelled in the forward direction;

a fingerprint reader, the fingerprint reader being configured to recognize a fingerprint of a user whereby the power source is configured to turn on when the fingerprint is recognized;

a charging output port being inset into the handle and being exposed within the handle, the charging output port being electronically coupled to the power source;

a shock absorber being coupled to the steering column of the handle, the shock absorber being configured to compress and extend when the board is propelled over a bump thereby dampening a force of an impact to the front wheel as the force travels from the front wheel to the pair of grips, the shock absorber comprising a coil over shock device; and a central processing unit being electronically coupled to each of the power source, the brake light, the throttle button, the brake button, the front motor, the pair of rear motors, the transmitter, and the display whereby the central processing unit is configured to selectively control one or more of the power source, the brake light, the throttle button, the brake button, the front motor, the pair of rear motors, the transmitter, and the display, the central processing unit including:

a memory unit being configured to store a copy of the fingerprint of the user, the central processing unit being configured to compare the copy to the fingerprint read by the fingerprint reader.

* * * * *